United States Patent Office 3,597,378
Patented Aug. 3, 1971

3,597,378
POLYAMIDE WAXES IN ASPHALT AND BITUMEN
Richard Kubiak, Cincinnati, and William P. Enlow, Reading, Ohio, assignors to Carlisle Chemical Works, Inc., Reading, Ohio
No Drawing. Filed Aug. 29, 1968, Ser. No. 756,319
Int. Cl. C08g 51/52
U.S. Cl. 260—28                                6 Claims

ABSTRACT OF THE DISCLOSURE

A bituminous product, preferably asphalt, is prepared having as a flow point stabilizer a high melting synthetic wax or resinous amide which is either (1) the condensation product of (a) HOOCR$_1$COOH+ (b) R$_2$COOH+ (c) R$_3$NHR$_4$NHR$_3$ or (2) R$_5$COOH+R$_3$NHR$_4$NHR$_3$ where R$_1$ is aliphatic hydrocarbon of 1 to 34 carbon atoms, R$_2$ is aliphatic hydrocarbon or halohydrocarbon of at least seven carbon atoms, R$_3$ is hydrogen or lower alkyl, R$_4$ is aliphatic hydrocarbon of 2 to 10 carbon atoms, R$_5$ is alkyl of at least 19 carbon atoms. The molar ratio of (b) to (a) can be from $$\frac{1(b) - 6(b)}{(a)}$$

The acid groups of (a)+(b) equal the amine groups of (c).

The preferred amide products for use in the invention come within product (1) and are made from reactants (a) HOOC(CH$_2$)$_m$COOH+ (b) CH$_3$(CH$_2$)$_o$COOH or CH$_3$(CH$_2$)$_o$(CH=CH)$_p$COOH+ (c) H$_2$N(CH$_2$)$_n$NH$_2$ where $n$ is 2 to 10, $m$ is 4 to 20, $o$ is 6 to 22 and $p$ is 1 to 3.

The present invention relates to a bituminous product.

It is an object of the present invention to prepare bituminous products having improved flow point characteristics.

A more specific object is to prepare asphalt compositions which will not flow when subjected to temperatures at which they normally flow.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by incorporating in a bituminous product, preferably asphalt, either blown or unblown, 1 to 30% by weight of a synthetic waxy or resinous polyamide which is either (1) the condensation product of (a) HOOCR$_1$COOH+ (b) R$_2$COOH+

(c) R$_3$NHR$_4$NHR$_3$ or (2) R$_5$COOH+R$_3$NHR$_4$NHR$_3$ where R$_1$ is aliphatic hydrocarbon of 1 to 34 carbon atoms, R$_2$ is aliphatic hydrocarbon or halohydrocarbon of at least 7 carbon atoms, R$_3$ is hydrogen or lower alkyl, R$_4$ is aliphatic hydrocarbon of 2 to 10 carbon atoms, R$_5$ is alkyl of at least 19 carbon atoms. The molar ratio of (b) to (a) can be from 1(b) to 6(b) for each mole of (a). The acid groups of (a)+(b) should equal the amine groups of (c). In product (2) two moles of the acid are used per mole of the diamine.

The preferred amide products for use in the present invention come within product (1) and are made from reactants (a) HOOC(CH$_2$)$_m$COOH+ (b) CH$_3$(CH$_2$)$_o$COOH or CH$_3$(CH$_2$)$_o$(CH=CH)$_p$COOH+ (c) H$_2$N(CH$_2$)$_n$NH$_2$ where $n$ is 2 to 10, $m$ is 4 to 20, $o$ is 6 to 22 and $p$ is 1 to 3.

Many of the compounds within Formula 1 can be expressed by the formula (3)
$$R_6[N(R_7)-R_8-N(R_7)-R_9]_qN(R_7)-R_8-N(R_7)R_6$$

where R$_6$ is a saturated or unsaturated fatty acyl group or halofatty acyl group of at least 8 carbon atoms, R$_7$ is hydrogen or lower alkyl, R$_8$ is alkylene of 2 to 10 carbon atoms, preferably not over 6 carbon atoms, R$_9$ is saturated or unsaturated aliphatic diacyl group of 3 to 36 carbon atoms and $q$ is 1 or 2.

The condensation products (2) can be expressed by the formula (4)   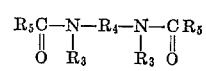

A typical example of a compound within Formula 3 is the amide formed by reacting 2 moles of stearic acid, 1 mole of sebacic acid and 2 moles of ethylene diamine with the elimination of 4 moles of water. The amide has the formula

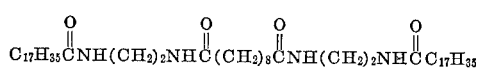

The polyamides employed in the present invention can be prepared in the manner set forth in Goldstein Pat. 2,609,381 or by any of the following procedures.

METHOD A 1 mole of a dibasic acid is heated, then the diamine added followed by the monobasic acid and the mixture heated further and the water of reaction is removed.

An example of this procedure is to heat 1 mole of sebacic acid in a flask fitted with stirrer, thermometer and distillation head, to 150° C., then add 2 moles of ethylene diamine at this temperature followed by 2 moles of stearic acid. The mixture is then heated slowly to 250° C. while allowing the water of reaction to distill off. The molten product is then poured into pans and allowed to cool. The product has the formula

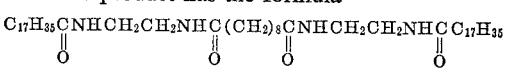

and a melting point range of 400–448° F.

METHOD B

The charge of dibasic acid, e.g. sebacic acid, and monobasic acid, e.g. stearic acid, is mixed and heated, e.g. to 100° C. and then the polyamine, e.g. ethylene diamine, is added. The remainder of the procedure is the same as in Method A and the product obtained is the same.

METHOD C

A lower alkyl ester of the monobasic acid, the diamine and lower alkyl ester of the dibasic acid are mixed and the alcohol removed.

An example of this procedure is to mix 4 moles of methyl palmitate, 3 moles of hexamethylenediamine and 1 mole of dimethyl suberate and heat while removing the methanol formed in a fractionating column. A final pot temperature of 250° C. is obtained and the liquid product is poured into pans and allowed to cool to a solid.

Methods A, B and C can be used to prepare condensation products of type (2) by simply omitting the dibasic acid component.

Examples of starting monobasic acid compounds are stearic acid, oleic acid, linoleic acid, linolenic acid, eleostearic acid, palmitic acid, lauric acid, decanoic acid, isodecanoic acid, neononanoic acid, myristic acid, tall oil fatty acids, soybean oil fatty acids, cottonseed oil fatty acids, coconut oil fatty acids, corn oil fatty acids, behenic acid, eicosanoic acid, hydrogenated cottonseed oil fatty acids, rape seed oil fatty acids, sunflower oil fatty acids, peanut oil fatty acids, safflower oil fatty acids, pelargonic acid, undecanoic acid, nonadecanoic acid, lignoceric acid, linseed oil fatty acids, 10-undecanoic acid, palmitoleic acid, elaidic acid, arucic acid, 2-chlorostearic acid, 2-chloropalmitic acid, methyl stearate, ethyl stearate, propyl stearate, methyl oleate, methyl palmitate, methyl laurate, methyl behenate.

Examples of starting dibasic acid compounds are malonic acid, adipic acid, azelaic acid, fumaric acid, sebacic acid, isosebacic acid, maleic acid, succinic acid, diglycolic acid, thiodipropionic acid, suberic acid, glutaric acid, pimelic acid, dimerized linoleic acid, dimerized linseed oil fatty acids, dimerized corn oil fatty acids, suberic acid, octadecanedoic acid, eicosanedioic acid, dimethyl suberate, dimethyl sebacate dimethyl adipate, diethyl sebacate, dipropyl pimelate, diisopropyl sebacate, dibutyl azelate.

Examples of starting diamines include ethylene diamine, propylene diamine, trimethylene diamine, tetramethylene diamine, hexamethylene diamine (1,6-diamino hexane), decamethylene diamine, 1,2-diaminobutane, N,N'-dimethyl ethylene diamine, N,N'-dimethyl 1,6-diaminohexane, N, N'-diethyl trimethylene diamine, N,N'-dipropyl ethylene diamine.

The waxy or resinous polyamides of the present invention have melting points in the range of 300 to 600° F. Typical examples of suitable polyamides suitable for use in the present invention are given in Table 1. The polyamides are formed from the monobasic acid, dibasic acid and diamine as indicated.

TABLE 1

| Example | Monobasic acid | Dibasic acid | Mole ratio monobasic to dibasic | Diamine | Melting point of polyamide, ° F. |
|---|---|---|---|---|---|
| 1 | Stearic | Adipic | 2:1 | 1,6-diamino hexane | 365–419 |
| 2 | do | do | 5:1 | Ethylene diamine | 364–374 |
| 3 | do | do | 6:1 | do | 302–320 |
| 4 | do | Azelaic | 2:1 | do | 428–446 |
| 5 | do | do | 4:3 | do | 464–473 |
| 6 | do | do | 3:1 | do | 410–419 |
| 7 | do | do | 6:1 | do | 347–365 |
| 8 | do | Sebacic | 2:1 | do | 400–448 |
| 9 | do | do | 4:3 | do | 446–464 |
| 10 | do | do | 3:1 | do | 390–437 |
| 11 | do | do | 4:1 | do | 390–437 |
| 12 | do | do | 5:1 | do | 330–410 |
| 13 | do | Pimelic | 4:3 | do | >500 |
| 14 | Oleic | Azelaic | 2:1 | do | 355–405 |
| 15 | do | do | 2.3:1 | do | 329–401 |
| 16 | Lauric | Sebacic | 5:1 | do | 365–412 |
| 17 | Behenic | | 2:0 | do | 280–291 |

EXAMPLE 18

1 part of the polyamide wax of Example 8 was added to 100 parts of molten unblown asphalt and the mixture allowed to cool to give a product having a melting point above that of the asphalt.

EXAMPLE 19

30 parts of the polyamide wax of Example 5 was added to 100 parts of molten unblown asphalt and the mixture allowed to cool and solidify to give a product having a melting of flow point substantially above that of the asphalt.

EXAMPLE 20

15 parts of the polyamide wax of Example 1 was added to 100 parts of molten blown asphalt and the mixture allowed to cool and solidify to give a product having a melting or flow point substantially above that of the blown asphalt.

EXAMPLE 21

Tests of the polyamide waxes of Examples 1–17 as flow point stabilizers in asphalt were carried out as follows. 15 parts of the polyamide were incorporated in 100 parts of the molten asphalt. The mixture was cast into a cone in a paper container, the paper removed, the cone placed on its base and the cone subjected to an oven test. The cones, 3 inches high and 1.5 inches at the base were placed upon 6-inch tin can lids in an oven preheated to 400° F. The asphalt (Witco 190° F.) control melted completely in 6 minutes at 400° F. The same asphalt containing 15 parts of the polyamide wax retained its original shape after 25 minutes under the same conditions in the case of each of the polyamide waxes of Examples 1–17.

Unless otherwise indicated all parts and percentages are by weight.

As used in the present specification and claims unless otherwise indicated the terms $HOOCR_1COOH$ and $R_2COOH$ are intended to include not only the free acids but other amide forming derivatives, e.g. the esters and acid halides.

What is claimed is:

1. A composition consisting essentially of bitumen together with 1 to 30% of a polyamide having a melting point of 300 to 600° F. as a flow point stabilizer, said polyamide being the condensation product of (a) $HOOCR_1COOH$, (b) $R_2COOH$, and (c) $R_3NHR_4NHR_3$ where the molar ratio of (b) to (a) is from 1:1 to 6:1 and the number of acid groups in (a) and (b) equals the amino groups of (c), where $R_1$ is an aliphatic group containing 1 to 34 carbon atoms and devoid of amino reactive groups, $R_2$ is aliphatic hydrocarbon or haloaliphatic hydrocarbon of at least 7 carbon atoms, $R_3$ is hydrogen or lower alkyl, and $R_4$ is aliphatic hydrocarbon of 2 to 10 carbon atoms.

2. A bituminous product according to claim 1 which is asphalt and $R_3$ is hydrogen.

3. A composition according to claim 1 consisting essentially of the bituminous product and said polyamide, the bituminous product being asphalt.

4. Asphalt composition consisting essentially of either 1 to 30% of a high melting polyamide as a flow point stabilizer, said polyamide having the formula $$R_6[N(R_7)-R_8-N(R_7)-R_9-]_qN(R_7)-R_8-N(R_7)R_6$$

wherein $R_6$ is a saturated or unsaturated fatty acyl group or a halofatty acyl group having at least 8 carbon atoms, $R_7$ is hydrogen or lower alkyl, $R_8$ is alkylene of 2 to 10 carbon atoms, $R_9$ is saturated or unsaturated aliphatic diacyl group of 3 to 36 carbon atoms and $q$ is 1 or 2.

5. An asphalt composition according to claim 4 where $R_6$ has the formula

where $R_{10}$ is aliphatic hydrocarbon of 7 to 23 carbon atoms, $R_7$ is hydrogen, $R_9$ has the formula

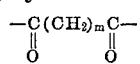

where $m$ is 4 to 20.

6. An asphalt composition according to claim 5 where $R_8$ is alkylene of two carbon atoms and $m$ is 4 to 8.

References Cited
UNITED STATES PATENTS

| | | | |
|---|---|---|---|
| 2,450,940 | 10/1948 | Cowan | 260—404.5 |
| 2,824,848 | 2/1958 | Wittcoff | 260—28 |
| 3,105,771 | 10/1963 | Simpson | 260—28 |

OTHER REFERENCES

A. H. Warth: "Chemistry and Technology of Waxes," Reinhold Pub., 1956 pp. 487, 488.

Kaupp et al.: Fette, Seifen, Anstrichmittel No. 7 1964, pp. 508–512.

MORRIS LIEBMAN, Primary Examiner

P. R. MICHL, Assistant Examiner

U.S. Cl. X.R.

106—273N, 279

UNITED STATES PATENT OFFICE
CERTIFICATE OF CORRECTION

Patent No. 3,597,378  Dated August 3, 1971

Inventor(s) Richard Kubiak and William P. Enlow

It is certified that error appears in the above-identified patent and that said Letters Patent are hereby corrected as shown below:

Claim 4, line 1, "either" should be --with--.

Signed and sealed this 7th day of March 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,597,378                                    Dated August 3, 1971

Inventor(s) Richard Kubiak and William P. Enlow

It is certified that error appears in the above-identified patent and that said Letters Patent are hereby corrected as shown below:

Claim 4, line 1, "Asphalt composition consisting essentially of" should read --Composition consisting essentially of asphalt--.

Signed and sealed this 16th day of May 1972.

(SEAL)
Attest:

EDWARD M. FLETCHER, JR.                ROBERT GOTTSCHALK
Attesting Officer                      Commissioner of Patents